(12) United States Patent
Meka et al.

(10) Patent No.: US 7,851,554 B2
(45) Date of Patent: Dec. 14, 2010

(54) PROPYLENE IMPACT COPOLYMERS WITH BALANCED IMPACT STRENGTH AND STIFFNESS

(75) Inventors: Prasadarao Meka, Seabrook, TX (US); Kevin Wayne Lawson, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 276 days.

(21) Appl. No.: 12/258,981

(22) Filed: Oct. 27, 2008

(65) Prior Publication Data

US 2010/0105848 A1    Apr. 29, 2010

(51) Int. Cl.
*C08L 23/00* (2006.01)
*C08L 23/10* (2006.01)

(52) U.S. Cl. .................. 525/191; 525/240; 524/536

(58) Field of Classification Search .......... 525/191, 525/240; 524/536
See application file for complete search history.

(56) References Cited

U.S. PATENT DOCUMENTS

| | | | |
|---|---|---|---|
| 4,950,720 A | 8/1990 | Randall, Jr. et al. | |
| 5,674,630 A | 10/1997 | Chatterjee | |
| 5,948,839 A | 9/1999 | Chatterjee | |
| 6,084,041 A | 7/2000 | Andtsjö et al. | |
| 6,111,039 A | 8/2000 | Miro et al. | |
| 6,201,069 B1 | 3/2001 | Fukazawa et al. | |
| 6,221,974 B1 | 4/2001 | Harkönen et al. | |
| 6,284,833 B1 | 9/2001 | Ford et al. | |
| 6,342,564 B1 | 1/2002 | Pitkanen et al. | |
| 6,472,474 B2 * | 10/2002 | Burkhardt et al. | 525/191 |
| 7,279,526 B2 * | 10/2007 | Malm et al. | 525/191 |

FOREIGN PATENT DOCUMENTS

WO    WO 99/20663    4/1999

* cited by examiner

*Primary Examiner*—Nathan M Nutter
(74) *Attorney, Agent, or Firm*—Kevin M. Faulkner

(57) ABSTRACT

Disclosed is a propylene impact copolymer comprising a first polypropylene having an $MFR^1$ within the range from 15 to 40 dg/min; a second polypropylene having an $MFR^2$ within the range from 50 to 190 dg/min; an elastomeric polymer; and wherein the propylene impact copolymer has an $MFR^{ICP}$ within the range from 6 to 18 dg/min; a 1% Secant Flexural Modulus of greater than 150 kpsi (1030 MPa); and an Izod Impact at 25° C. of greater than 10 ft-lbs/in (530 J/m). The impact copolymer may be produced in a two or three tandem-reactor system wherein the catalyst composition used in the second reactor to produce the second polypropylene is different from the catalyst composition used in the first reactor to produce the first polypropylene.

12 Claims, No Drawings

PROPYLENE IMPACT COPOLYMERS WITH BALANCED IMPACT STRENGTH AND STIFFNESS

FIELD OF THE INVENTION

The present disclosure relates to propylene-based impact copolymers comprising at least two polypropylenes and an elastomeric polymer, the impact copolymer having a balance of high impact strength, stiffness, and rapid injection molding cycle time.

BACKGROUND

Propylene impact copolymers ("ICP's") are used in materials handling applications such as pallets and crates, where good creep resistance and impact properties are required. Creep resistance is the property of deformation under load conditions. The creep resistance is proportional to the stiffness (e.g., Flexural Modulus) of the product and inversely related to the product melt flow rate ("MFR", 2.16 kg, 230° C.). Namely, the creep is lower with higher stiffness product, and is lower with lower MFR (or high molecular weight) product.

However, the cycle time—the time requiring to mold a single part by injection molding—is high with low MFR products (e.g., less than 4 dg/min) and thus it is preferred to have higher MFR product to achieve lower cycle time. In addition, impact resistance also needs to be adequate for the parts used under different temperature conditions, and the impact resistance in impact copolymers is a function of the ethylene-propylene rubber content. This is especially true for articles such as pallets and crates having a surface contacting face and a load carrying face with a space there between for accepting a carrier such as a fork lift, etc. Both surfaces must be strong enough to carry loads of 500 to 1200 lbs or more at temperatures as low as −10° C., yet the composition used to make the injection molded pallet must have an adequately high MFR to allow rapid cycle time production.

For improved cycle time with ICP's, high MFR product is desirable as it is much easier to fill out the mold in comparison to a low MFR product. However, the high MFR ICP product requires even higher MFR polypropylene matrix in comparison to a low MFR ICP. For example, a 10 dg/min ICP, with about 18 wt % ethylene-propylene ("EP") rubber requires a matrix polypropylene having an MFR of approximately 20 dg/min versus only about 8 dg/min polypropylene for a 4 dg/min ICP. Due to the much lower polypropylene MFR in the 4 MFR ICP as compared to the 10 MFR ICP, the creep resistance is significantly better with the 4 MFR ICP.

Therefore, there is a desire to achieve the delicate balance between ICP MFR for better cycle time and creep resistance for use under load conditions, and the required impact resistance. The inventors solve this and other problems by providing a composition and method of producing an ICP having at least two polypropylenes having unbalanced MFRs.

SUMMARY

Disclosed herein is a propylene impact copolymer comprising at least two unbalanced polypropylenes and at least one elastomeric polymer wherein the propylene impact copolymer has an $MFR^{ICP}$ within the range from 6 to 18 dg/min; a 1% Secant Flexural Modulus of greater than 150 kpsi (1030 MPa); and an Izod Impact at 25° C. of greater than 10 ft-lbs/in (530 J/m). In one embodiment, the at least two unbalanced polypropylenes comprise a first polypropylene having an $MFR^1$ and a second polypropylene having an $MFR^2$; wherein the $MFR^2/MFR^1$ is greater than 1.5.

Also disclosed herein is a method of producing a propylene impact copolymer comprising (a) contacting a catalyst composition with propylene, a first amount of a chain terminating agent and optionally ethylene or C4 to C12 α-olefins in a first reactor to form a first polypropylene comprising no more than 5 wt %, by weight of the first polypropylene, of ethylene or α-olefin derived units; (b) contacting a catalyst composition and first polypropylene with propylene, a second amount of a chain terminating agent, and optionally ethylene or C4 to C12 α-olefins in a second reactor to form a second polypropylene comprising no more than 5 wt %, by weight of the second polypropylene, of ethylene or α-olefin derived units, wherein the second amount of chain terminating agent is greater than the first amount of chain terminating agent; and (c) contacting a catalyst composition, first polypropylene and second polypropylene in a third reactor with propylene and ethylene to form ethylene-propylene copolymer comprising within the range from 35 to 70 wt %, by weight of the copolymer, of ethylene-derived units.

In certain embodiments, the impact copolymer may be produced in a two or three tandem-reactor system wherein the catalyst composition used in the second reactor to produce the second polypropylene is different from the catalyst composition used in the first reactor to produce the first polypropylene.

The various descriptive elements and numerical ranges disclosed herein can be combined with other descriptive elements and numerical ranges to describe preferred embodiments of the impact copolymer(s) and methods of making the impact copolymer(s); further, any upper numerical limit of an element can be combined with any lower numerical limit of the same element to describe preferred embodiments. In this regard, the phrase "within the range from X to Y" is intended to include within that range the "X" and "Y" values.

DETAILED DESCRIPTION

Disclosed herein are propylene impact copolymers comprising at least two "unbalanced" polypropylenes and at least one elastomeric polymer, the impact copolymer having a balance of stiffness, impact strength and processability that make it suitable for injection molded weight-carrying articles. Examples of desirable articles are pallets and crates used to carry and/or contain shipped goods. By "unbalanced," what is meant is that the MFR for each polypropylene (the MFR of one being greater than the other) differs by at least 30% and/or the ratio of the high MFR to low MFR polypropylene is greater than 1.5. In one embodiment, the propylene impact copolymer is produced in a reactor system (or train) comprising two or three reactors in series. The propylene impact copolymer can be characterized by having an $MFR^{ICP}$ within the range from 6 to 18 dg/min; a 1% Secant Flexural Modulus of greater than 150 kpsi (1030 MPa); and an Izod Impact at 25° C. of greater than 10 ft-lbs/in (530 J/m). In one embodiment, the propylene impact copolymers consist essentially of at least two, preferably two unbalanced polypropylenes and at least one, preferably one elastomeric polymer. By "consisting essentially of," what is meant is that the propylene impact copolymers may have up to 4 wt %, by weight of the propylene impact copolymer, of "additives."

As used herein, "polypropylenes" can include homopolymers of propylene derived units and copolymers of propylene derived units comprising within the range from 0.1 to 1 or 3 or 5 wt %, by weight of the copolymer, of ethylene or C4 to C12 α-olefin derived units, ethylene derived units in a particular embodiment. In certain embodiments, the polypropylene(s) are isotactic. Isotacticity of the propylene sequences in the polypropylenes can be achieved by polymerization with the choice of a desirable catalyst composition. The isotacticity of the polypropylenes as measured by $^{13}$C NMR, and expressed as meso diad content is greater than 90% (meso diads [m]>0.90) or 95% or 97% or 98% in certain embodiments, determined as in U.S. Pat. No. 4,950,720 by $^{13}$C NMR. Expressed another way, the isotacticity of the polypropylenes as measured by $^{13}$C NMR, and expressed as pentad content, is greater than 93% or 95% or 97% in certain embodiments. The isotacticity of the first and second polypropylenes (described below) may be the same or different.

As used herein, "elastomeric polymers" are materials that can stretch and recover such that they exhibit an Ultimate Tensile Strength of greater than 5.5 MPa, an Ultimate Elongation of at least 200% and Tension Set of less than 20% at 100% deformation, as determined by ASTM D412. Non-limiting examples of elastomeric polymers include natural rubber (NR), synthetic polyisoprene (IR), butyl rubber (copolymer of isobutylene and isoprene, IIR), halogenated butyl rubbers (chloro-butyl rubber: CIIR; bromo-butyl rubber: BIIR), polybutadiene (BR), styrene-butadiene rubber (SBR), nitrile rubber, hydrogenated nitrile rubbers, chloroprene rubber (CR), polychloroprene, neoprene, EPM (ethylene-propylene rubber) and EPDM rubber (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA) chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polysulfide rubber, and blends thereof. In certain embodiments, the elastomeric polymer is ethylene-propylene rubber. The elastomeric polymer may be cured or uncured, preferably uncured.

As used herein, "additives" include, for example, stabilizers, surfactants, antioxidants, anti-ozonants (e.g., thioureas), fillers, colorants, nucleating agents, anti-block agents, UV-blockers/absorbers, coagents (cross-linkers and cross-link enhancers), hydrocarbon resins (e.g., Oppera™ resins), and slip additives and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art. In certain embodiments, cross-linkers and cross-link enhancers are absent from the propylene impact copolymers.

As used herein, a "nucleating agent" is any compound or blend of compounds whose overall concentration is less than 0.50 wt %, by weight of the polymer or blend to which it is added, that reduces the crystallization half time at 135° C. by at least 50%. Non-limiting examples of nucleating agents include bicyclo[2.1.1]heptane-2,3-dicarboxylic acid (cadmium or disodium salt), bicyclo[2.1.1]hept-5-ene-2,3-dicarboxylic acid (cadmium or disodium salt), amorphous silicon dioxide, metal oxides, aluminum salts, talc, silica and surface-modified silica, dibenzyl sorbitol, adipic acid, benzoic acid, sodium benzoate, 2-mercaptobenzimidazol, potassium dehydroabietate, sodium 2,2-methylene-bis-(4,6-di-tert-butylphenyl phosphate), N,N-dicyclohexyl-2,6-naphthalene dicarboxamide, 1,3:2,4-bis(3,4-dimethylbenzylidene) sorbitol, and blends thereof. In a particular embodiment, the nucleating agent is a composition comprising silicon dioxide, an alkyl amine and a alkyl-di-carboxylic acid compound (e.g. bicyclo[2.1.1]hept-5-ene-2,3-dicarboxylic acid). The propylene impact copolymers may include within the range from 0.001 or 0.005 to 0.05 or 0.10 or 0.5 wt %, by weight of the impact copolymer, of a nucleating agent or blend thereof, or stated another way, within the range from 200 or 300 to 1300 or 1500 ppm.

As used herein, the "propylene impact copolymer" comprises at least two "unbalanced" polypropylenes and at least one elastomeric polymer. In certain embodiments, the propylene impact copolymer is characterized by possessing a $MFR^{ICP}$ (melt flow rate of the propylene impact copolymer) within the range from 6 or 8 or 9 to 13 or 15 or 18 dg/min; a 1% Secant Flexural Modulus of greater than 150 kpsi (1030 MPa); and an Izod Impact at 25° C. of greater than 10 ft-lbs/in (530 J/m). In certain embodiments, the at least two unbalanced polypropylenes comprise a first polypropylene having an $MFR^1$ and a second polypropylene having an $MFR^2$; wherein the $MFR^2/MFR^1$ is greater than 1.5 or 2 or 2.5.

In particular embodiments, the propylene impact copolymer comprises a first polypropylene having an $MFR^1$ within the range from 8 or 15 or 18 to 35 or 40 dg/min; a second polypropylene having an MFR2 within the range from 50 or 65 to 100 or 190 dg/min; and an elastomeric polymer. The propylene impact copolymer described in this and other embodiments may also be characterized by possessing an $MFR^{ICP}$ within the range from 6 or 8 or 9 to 13 or 15 or 18 dg/min; a 1% Secant Flexural Modulus of greater than 150 kpsi (1030 MPa); and an Izod Impact at 25° C. of greater than 10 ft-lbs/in (530 J/m).

In certain embodiments, the first, or second, or both polypropylenes are propylene copolymers comprising within the range from 0.1 to 5 wt %, by weight of the copolymer, of ethylene or C4 to C12 α-olefin derived units. In other embodiments, the first, or second, or both polypropylenes are propylene homopolymers. In a preferred embodiment, both polypropylenes are propylene homopolymers. The propylene impact copolymer comprises within the range from 30 or 40 to 60 or 70 wt %, by weight of the propylene impact copolymer, of the first polypropylene in one embodiment. The propylene impact copolymer comprises within the range from 10 or 20 to 30 or 40 wt %, by weight of the propylene impact copolymer, of the second polypropylene in another embodiment. Described another way, the polypropylenes are present in the impact copolymer such that the $MFR^2/MFR^1$ is within the range from 2 or 2.5 or 3 to 4 or 4.5 or 5 or 6. This may be achieved by any means such as by adjusting the relative amounts of each polypropylene in the impact copolymer, adjusting the MFR of each polypropylene in the impact copolymer (by, for example, changes in the catalyst composition in going from one reactor to another), or both.

In certain embodiments, the propylene impact copolymer comprises within the range from 15 or 20 or 22 to 26 or 30 or 35 wt %, by weight of the propylene impact copolymer, of the elastomeric copolymer. The elastomeric polymer is an ethylene-propylene copolymer in a particular embodiment comprising within the range from 35 or 40 or 45 to 60 or 65 or 70 wt %, by weight of the copolymer, of ethylene-derived units. In a more particular embodiment, the elastomeric polymer is uncured; stated another way, curing agents as are known in the art are absent from the elastomer portion of the impact copolymer, or preferably from the entire impact copolymer. In yet another embodiment, cross-linkable monomer units are absent from the elastomeric polymer; the elastomeric polymer consisting essentially of an ethylene-propylene copolymer in a particular embodiment.

The desirable properties of the propylene impact copolymer may be adjusted in part by the balance of properties between the polypropylene matrix and the elastomeric domains. In a particular embodiment, the elastomeric polymer has an intrinsic viscosity $IV^R$, and the at least first and second polypropylenes have a collective intrinsic viscosity $IV^{PP}$, wherein the ratio of $IV^R/IV^{PP}$ is within the range from 1.50 or 1.75 or 1.80 to 2.70 or 3.00 or 4.00. The term "intrinsic viscosity" is used to indicate the viscosity of a solution of a material, in this case a solution of a polymer, in a given solvent at a given temperature, when the polymer composition is at infinite dilution. According to the ASTM standard test method D 1601-78, its measurement involves a standard capillary viscosity measuring device, in which the viscosity of a series of concentrations of the polymer in the solvent at the given temperature are determined. In the case of the polymers of the present invention, decalin (decahydronaphthalene) is an illustrative suitable solvent and a typical temperature is 135° C. From the values of the viscosity of solutions of varying concentration, the "value" at infinite dilution can be determined by extrapolation. In the case of the present propylene impact copolymers that are reactor produced in situ, the homopolymer portion is initially produced and the intrinsic viscosity of that portion is measured directly. The intrinsic viscosity of the elastomeric portion cannot be measured directly. The intrinsic viscosity of the total propylene impact copolymer product is determined and the intrinsic viscosity of the elastomeric polymer portion ($[\eta]_{elast}$) is calculated as the quotient of the intrinsic viscosity of the total propylene impact copolymer ($[\eta]_{whole}$) less the fraction of polypropylene times its intrinsic viscosity ($[\eta]_{PP}$), all divided by the fraction of the total impact copolymer which is elastomeric polymer. The formula is $[\eta]_{elast}=[[\eta]_{whole}-(1-Fc)[\eta]_{PP}]/Fc$ wherein Fc is the amount of elastomeric polymer and is stated in terms of a fraction of elastomeric polymer, ethylene/propylene copolymer in a particular embodiment, in the total propylene impact copolymer (instead of as a percentage as in the remainder of the specification and claims). This fraction is determined by conventional procedures, including infrared analysis.

The propylene impact copolymer, described in its various embodiments, can be further characterized by possessing an Instrumented Impact (5 mph at −29° C.) of greater than 35 ft-lbs (47 J), a Tensile at Yield of greater than 3100 psi (21.4 MPa), a Gardner Impact (−29° C.) of greater than 300 in-lbs (34 N-m), or a combination of any two or more of these properties.

The propylene impact copolymer can be formed by any suitable means into articles of manufacture such as automotive components, pallets, crates, cartons, appliance components, sports equipment and other articles that would benefit from high impact resistance and low creep. In a particular embodiment, the propylene impact copolymers described herein are formed into pallets, and are injection molded into pallets in a particular embodiment. The impact copolymers may comprise from 200 to 1500 ppm of a nucleating agent. The presence of nucleating agents may benefit the impact copolymers by reducing the crystallization rate and hence improve the cycle time (injection, packing, cooling and part ejection) in the injection molding process. In such embodiments, the propylene impact copolymers possess a crystallization half-time at 135° C. is less than 15 or 12 or 10 or 5 or 2 minutes, or less than 60 or 40 seconds. The cycle time for injection molding is improved in certain embodiments such that the cycle time is less than 80 or 70 or 60 seconds.

The propylene impact copolymers may be produced by any suitable means such as by in situ reactor processes, melt blending of one or more of the components, or a combination of the two. In one embodiment, the propylene impact copolymer is produced in situ within at least one reactor, where the at least one reactor may operate in separate stages to produce one or more of the components (polypropylene and/or elastomer). One or more catalyst compositions are typically used to polymerize the monomers and optional comonomers, where the catalyst typically includes a transition metal component and an electron donor and/or co-catalyst component(s). In another embodiment, the propylene impact copolymer is produced in situ within at least two reactors associated in series, and is produced in situ in a three reactor system associated in series. When one, two, three or more reactors are used, the same catalyst composition may be used throughout, or separate catalyst compositions may be used at each stage and/or reactor or the catalyst composition may be modified at any stage and/or reactor.

In a particular embodiment, the propylene impact copolymer is produced in situ within three reactors, wherein the first polypropylene is produced in a first reactor and the second polypropylene is produced in a second reactor and the elastomeric polymer is produced in a third reactor, each reactor associated in series. In yet another particular embodiment, the propylene impact copolymer is produced in situ within three reactors, wherein the first polypropylene is produced in a first reactor with a first catalyst composition and the second polypropylene is produced in a second reactor with a second catalyst composition, wherein the first and second catalyst compositions differ from one another, and the elastomeric polymer is produced in a third reactor, each reactor associated in series. The catalyst composition may be modified by changing the identity and/or amount of the transition metal component or the electron donors and/or co-catalysts used in conjunction with the transition metal component. A desirable catalyst composition arrangement is disclosed in WO 99/20663A2, wherein sequential electron donors are used to modify the catalyst composition from one reactor to another, the sequential donors being different compounds or mixtures of compounds. For example, a titanium-magnesium based Ziegler-Natta catalyst composition may be used in all of the reactors, the same titanium-magnesium composition in a particular embodiment, but the aluminum-alkoxy/alkyl "electron donor" compound used in the first reactor may be different than the aluminum-alkoxy/alkyl compound used in the second reactor, or alternatively, the ratios of a mixture of aluminum-alkoxy/alkyl compounds may be changed in going from the first to the second reactor. In this manner, the isotacticity and/or MFR of the first and second polypropylenes can be tailored.

In embodiments where one or more reactors are used to produce the propylene impact copolymer(s), chain terminating agent(s) (e.g., hydrogen) may be used to control the MFR (molecular weight) of the polypropylene(s). The chain terminating agents may be used as a means of adjusting the MFR of components of the impact copolymer either alone or in conjunction with other means. In a particular embodiment, the method of producing the propylene impact copolymer comprises contacting a catalyst composition with propylene, a first amount of a chain terminating agent and optionally ethylene or C4 to C12 α-olefins in a first reactor to form a first polypropylene comprising no more than 5 wt %, by weight of the first polypropylene, of ethylene or α-olefin derived units; followed by contacting the catalyst composition and first polypropylene with propylene, a second amount of a chain terminating agent, and optionally ethylene or C4 to C12 α-olefins in a second reactor to form a second polypropylene comprising no more than 5 wt %, by weight of the second polypropylene, of ethylene or α-olefin derived units, wherein the second amount of chain terminating agent is greater than the first amount of chain terminating agent; and, finally, contacting the catalyst composition, first polypropylene and second polypropylene in a third reactor with propylene and ethylene to form ethylene-propylene copolymer comprising within the range from 35 or 40 or 45 to 60 or 65 or 70 wt %, by weight of the impact copolymer, of ethylene-derived units.

In one embodiment, the first amount of chain terminating agent is added to the one or more reactors and/or one or more stages within a reactor(s) such that the first polypropylene has an $MFR^1$ within the range from 8 or 15 or 18 to 35 or 40 dg/min. The second amount of chain terminating agent is added in certain embodiments such that the second polypropylene has an $MFR^2$ within the range from 50 or 65 or 70 to 100 or 120 or 190 dg/min. Described another way, the second amount of chain terminating agent in certain embodiments is greater than the first amount of chain terminating agent such that the $MFR^1$ of the first polypropylene is at least 30 or 40 or 50% less than the $MFR^2$ of the second polypropylene. Stated in yet another way, the chain terminating agents are added to the reactor(s) such that the $MFR^2/MFR^1$ is within the range from 2 or 2.5 or 3 to 4 or 4.5 or 5 or 6 in certain embodiments, and greater than 1.5 or 2.0 or 2.5 or 3.0 in other embodiments. The amount of chain terminating agent can be varied by any suitable means in the reactor(s), and in one embodiment the amount of the first chain terminating agent is less than 2000 or 1800 mol ppm as measured in the propylene feed to the reactor; the amount of the second chain terminating agent is greater than 2500 or 2800 mol ppm as measured in the propylene feed to the reactor.

In a particular embodiment, the first and second reactors are slurry-loop reactors and the third reactor is a gas phase reactor. The first and second reactors produce the polypropylenes, homopolymers in a particular embodiment, and the gas phase reactor produced the elastomeric polymer in another embodiment, thus creating an in situ blend of elastomer in a polypropylene matrix. As described above, the propylene impact copolymer may comprise within the range from 30 or 40 to 60 or 70 wt %, by weight of the propylene impact copolymer, of the first polypropylene; within the range from 10 or 20 to 30 or 40 wt %, by weight of the propylene impact copolymer, of the second polypropylene; and within the range from 15 or 20 or 22 to 26 or 30 or 35, by weight of the propylene impact copolymer, of the elastomeric copolymer. These amounts can be achieved, in the case where one or more reactors is used to produce the propylene impact copolymer, by any suitable means known to those skilled in the art including control of the residence time in each stage and/or reactor, amount and/or identity of the catalyst composition(s), variation in the reactants in each stage and/or reactor (i.e., propylene, comonomer, hydrogen, etc), combinations of these, or other means.

In certain embodiments of the three reactor process, catalyst components, propylene, chain terminating agent and any other optional monomers are fed to a first loop reactor for a first homopolymerization or copolymerization process. The high heat removal capability of the loop reactors, resulting from the turbulent mixing of the slurry and the large surface-to-volume ratio of the reactor, enables high specific outputs. Operating conditions are typically in the range of 60 to 80° C., 500 psi to 700 psi of pressure, and an amount of chain terminating agent, hydrogen in a preferred embodiment, of less than 2000 or 1800 mol ppm as measured in the propylene feed to the reactor, and within the range from 1000 or 1100 to 1200 or 1800 or 2000 mol ppm in another embodiment. The polymer produced from the first reactor (along with residual chain terminating agent and monomers) is then transferred to a second loop reactor where the operating conditions may be the same or different. Additional monomer, chain terminating agent, and optional comonomer may be added also. In a particular embodiment, at least the amount of the second chain terminating agent will be different, wherein the amount of chain terminating agent, hydrogen in a preferred embodiment, is greater than 2500 or 2800 mol ppm as measured in the propylene feed to the second reactor, and within the range from 2500 or 3000 or 3400 to 3600 or 4000 mol ppm in another embodiment.

Upon exiting the second loop reactor, the polypropylene slurry is depressurized and flashed at a pressure that allows for recycle of the vaporized monomer by condensation using cooling water or other cooling means, and is sufficient for gas phase polymerization. The polypropylene and catalyst composition mixture is then transferred to a gas phase reactor. The elastomeric polymer component is produced in this gas phase reactor in certain embodiments. The elastomeric polymer, an ethylene-propylene copolymer in a preferred embodiment, is produced in a particular embodiment by use of a fluidized bed gas phase reactor at operating temperatures within the range of from 50 or 60 to 80 or 100° C., and pressures within the range from 100 or 150 to 250 or 300 psi. Polymer exiting the polymerization section passes through a low pressure separator, in which the remaining monomer is separated for recycle, a steam treatment vessel for deactivation of the residual catalyst is present in certain embodiments, and then a small fluid bed dryer or other drying means. An example of such a process includes the so called "Spheripol" reactor process.

The catalyst composition can be any suitable catalyst composition known for polymerizing olefins to produce polyolefins and is desirably a composition that can control the isotacticity of the polymers that are produced. Non-limiting examples of suitable catalysts compositions include Ziegler-Natta catalysts, metallocene catalysts, chromium catalysts, metal-imide/amine coordination catalysts, and combinations of such catalysts each with its desirable co-catalyst and/or electron donor or other modifying agent known in the art. An example of certain desirable catalyst compositions is described in WO 99/20663, describing a Ziegler-Natta catalyst composition using any one of a combination of aluminum alkyl donor systems. The selection of other conditions for producing the individual impact copolymer components and the whole propylene impact copolymer is reviewed by, for example, G. DiDrusco and R. Rinaldi in "Polypropylene-Process Selection Criteria" in HYDROCARBON PROCESSING 113 (November 1984), and references cited therein.

Several non-limiting examples of the compositions and process follow.

EXAMPLES

The unbalanced MFRs in loop reactors used for making polypropylenes (in this case each a homopolymer) can be accomplished in many combinations, namely given the final MFR, the two reactor MFRs can be made under different conditions as shown in the Table 1 below. The production split between the first and second reactors is assumed to be 2:1, for the data shown in Table 1. The unbalancing in this case is achieved by a difference in the amount of hydrogen present in each reactor. As an example, the target homopolymer for the matrix phase MFR is 35 dg/min, and this case is shown as case number 9, where the both reactors are the same MFR. The extent of unbalancing in MFRs between the two reactors is least for case number 8 and broadest for case number 1. Because of the wide differences in the MFR in the first and second reactors, the case where the MFR is the lowest in Reactor 1 will have the better resistance to creep (for example Case 1>Case 2> . . . >Case 9). However, the degree of difficulty in making such an impact copolymer increases with the extent of unbalancing due at least in part to hydrogen solubility limitations in bulk slurry polymerization reactors and the economics associated with removing the chain terminating agent (e.g., hydrogen) from the recycled monomer. Therefore, the design includes examples, balancing the process difficulties in making the impact copolymer and the unbalancing in the homopolymer MFR for better creep resistance.

TABLE 1

Examples of homopolymer unbalancing in the two reactors

| Case No. | Reactor 1 MFR (dg/min) | Reactor 2 MFR (dg/min) | Blended MFR (dg/min) |
|---|---|---|---|
| 1 | 17 | 189 | 35 |
| 2 | 18 | 165.2 | 35 |
| 3 | 19 | 145.6 | 35 |
| 4 | 20 | 129.2 | 35 |
| 5 | 21 | 115.2 | 35 |
| 6 | 22 | 103.4 | 35 |
| 7 | 23 | 93.2 | 35 |
| 8 | 24 | 84.4 | 35 |
| 9 | 35 | 35 | 35 |

The comparative example 3 was produced in a series of continuous commercial scale reactors known in the art as the "Spheripol-Hypol Process" (or "ExxonMobil Polypropylene Process"). A magnesium chloride supported titanium catalyst was selected from the group of THC-C type catalyst solid systems available from Toho Titanium Corporation of Japan. The donor system utilized in this example—described in U.S. Pat. No. 6,087,495—is a blend of 95 mole % propyltriethoxysilane (PTES) and 5 mole % dicyclopentyldimethoxysilane (DCPMS). The donor used for comparative examples 1 and 2 is methylcyclohexyl di-methoxysilane (MCMS). Catalyst composition preparation was carried out continuously in situ by contacting the catalyst solids, triethylaluminum, and the donor system under conditions known in the art to yield active, stereospecific catalyst for polymerization of propylene. The activated catalyst was continuously fed to a prepolymerization reactor where it was continuously polymerized in propylene to a productivity of approximately 100 g-polymer/g-cat. The prepolymerized catalyst was then continuously fed to a series of two bulk slurry loop reactors, and polymerization continued under conditions to achieve a "balanced" homopolymer with a yield of approximately 50 kg-polymer/g-cat. The reaction slurry (homopolymer granules in bulk propylene) was continuously removed from the second loop polymerization reactor and the homopolymer granules were continuously separated from the liquid propylene. The active homopolymer granules were fed directly to a gas phase reactor where polymerization continued under conditions known in the art to produce ethylene-propylene bipolymer within the pores of the homopolymer "matrix" granules. The final product, referred to in the art as an "impact copolymer," was continuously withdrawn from the gas phase reactor and separated from unreacted monomer to produce a granular product for compounding and mechanical property testing.

The granules from the reactor are stabilized with 0.15 wt % Irganox™ 1010, 0.05 wt % Ultranox™ 626A, and either with 0.075 wt % sodium benzoate (fine form) or 0.03 wt % Hyerform™ HPN-68L nucleating agent (Hyerform™ is a 80/10/10 blend of bicyclo[2.1.1]heptane-2,3-dicarboxylic acid (disodium salt), 13-docosenamide, and amorphous silicon dioxide (Milliken Chemical Co.)), and pelletized on a twin screw extruder. The pellets were injection molded using ASTM test specimens and the physical properties tested as per ASTM guidelines. Table 2 lists the physical properties of these comparative examples.

The inventive examples 1-5 were produced in a series of continuous pilot scale reactors, which were designed specifically as a scaled down version of the process known in the art as the "Spheripol-Hypol Process" (or "ExxonMobil Polypropylene Process"). The same catalyst composition (donor system utilized is the same as used comparative example 3) and, process was used as in the comparative examples: catalyst preparation was carried out continuously in situ by contacting the catalyst solids, triethylaluminum, and the donor system under conditions known in the art to yield active, stereospecific catalyst for polymerization of propylene. The activated catalyst was continuously fed to a prepolymerization reactor where it was continuously polymerized in propylene to a productivity of approximately 100 g-polymer/g-cat. The prepolymerized catalyst was then continuously fed to a series of two bulk slurry loop reactors, and polymerization continued under conditions to achieve an "un-balanced" homopolymer with a yield of approximately 50 kg-polymer/g-cat. The un-balanced polymerization conditions, specifically the hydrogen concentrations in the reactors, were chosen so as to produce polymer with different average molecular weights (as measured by MFR) in each of the reactors; thus effectively broadening the molecular weight distribution of the overall product. For these inventive examples the hydrogen concentrations in the reactors were set by controlling the hydrogen in the propylene feed to the first reactor at 1100-1200 mol ppm, and in the feed to the second reactor at 3400-3600 mol ppm. The reaction slurry (homopolymer granules in bulk propylene) was continuously removed from the second loop polymerization reactor and the homopolymer granules were continuously separated from the liquid propylene. The active homopolymer granules were fed directly to a gas phase reactor where polymerization continued under conditions known in the art to produce ethylene-propylene bipolymer within the pores of the homopolymer "matrix" granules. The final product, referred to in the art as an "impact copolymer," was continuously withdrawn from the gas phase reactor and separated from unreacted monomer to produce a granular product for compounding and mechanical property testing. The granules from the reactor were stabilized with anti-oxidants along with nucleating agent Hyerform™ HPN-68L and converted into pellets using a 30 mm twin screw extruder. The pellets were injection molded into ASTM test specimens and the physical properties were tested as per ASTM guidelines. Table 3 lists the physical properties of these inventive examples. The "IV" or intrinsic viscosity ratio is the ratio of the intrinsic viscosity of the rubber to the combined intrinsic viscosity of the polypropylenes.

TABLE 2

Physical properties of comparative examples.

| Property | Comparative Example 1 | Comparative Example 2 | Comparative Example 3 |
|---|---|---|---|
| Reactor 1, MFR (dg/min) | 7 | 16.5 | 50 |
| Reactor 2, MFR (dg/min) | 7 | 16.5 | 50 |
| MFR Ratio (Rx 2/Rx 1) | 1.0 | 1.0 | 1.0 |
| Final blended PP MFR (dg/min) | 7 | 16.5 | 50 |
| EP rubber (wt %) | 17 | 17 | 23 |
| Ethylene in EP rubber (wt %) | 53 | 53 | 53 |
| Impact copolymer MFR (dg/min) | 4 | 8 | 16 |
| IV Ratio | 1.9 | 1.9 | 2.5 |
| Nucleating agent (sodium benzoate) (wt %) | 0.075 | 0.075 | 0.075 |
| 1% Sec Flexural modulus (kpsi) | 189 | 187 | 157 |
| Room temperature notched Izod (ft-lbs/in) | 11.6 (no break) | 5.91 (hinge break) | 4.3 (complete break) |
| Gardner −29° C. (in-lbs) | >320 | 293 | 312 |
| Failure mode | 10 D* | 7 DB, 5 B | 10 D |
| Instrumented impact @ 5 mph at 23° C. (ft-lbs) | 28.8 (5 D) | 28.7 (5 D) | 26.4 (5 D) |
| Instrumented impact @ 5 mph at −29° C. (ft-lbs) | 37.2 (5 D) | 37.6 (4D, 1 DB) | 36.8 (3 D, 2 DB) |
| Instrumented impact @ 15 mph at 23° C. (ft-lbs) | 32.6 (5 D) | 32.2 (5 D) | 29.8 (5 D) |
| Instrumented impact @ 15 mph at −29° C. (ft-lbs) | 39.8 (4 D, 1 DB) | 28.2 (1D, 2DB, 2BD) | 35.2 (2D, 2DB, 1BD) |
| Creep deflection (parts) | Good | Good | close to the specification upper limit |
| Impact tests (parts) | Pass | Fail | Fail |
| Cycle time | Defensive | Defensive | Good |

*Failure mode: B—brittle, BD—brittle-ductile, DB—ductile-brittle, and D—ductile

TABLE 3

Physical properties of inventive examples.

| Property | Example 1 | Example 2 | Example 3 | Example 4 | Example 5 |
|---|---|---|---|---|---|
| Reactor 1, MFR (dg/min) | 25 | 25.5 | 21.2 | 20.5 | 22 |
| Reactor 2, MFR (dg/min) | 87 | 87 | 96 | 64 | 77 |
| MFR Ratio (Rx 2/Rx 1) | 3.48 | 3.4 | 4.5 | 3.1 | 3.5 |
| Final blended PP MFR (dg/min) | 36.4 | 36.5 | 33.3 | 28.8 | 32 |
| EP rubber (wt %) | 26.8 | 26.8 | 26.9 | 24.9 | 25 |
| Ethylene in EP rubber (wt %) | 51 | 53 | 53 | 54 | 53 |
| Impact copolymer MFR (dg/min) | 13.7 | 13.4 | 12.1 | 10.9 | 10.7 |
| IV Ratio | 1.83 | 1.86 | 1.87 | 1.93 | 2.2 |
| Nucleating agent (HPN-68L) (wt %) | 0.03 | 0.03 | 0.03 | 0.03 | 0.03 |
| Tensile at yield (psi) | 3125 | 3095 | 3086 | 3246 | 3248 |
| Elongation at Yield (%) | 6.1 | 6.1 | 6.3 | 5.4 | 5.5 |
| Elongation at break (%) | 344 | 258 | 203 | 96 | 107 |
| 1% Sec Flexural Modulus (kpsi) | 159 | 159 | 160 | 171 | 177 |
| Heat distortion temperature (° C.) | 93.6 | 93.5 | 93 | 94 | 96.4 |
| Room temperature Notched Izod (ft-lbs/in) | 10.5 (No break) | 10.6 (No break) | 11.3 (No break) | 10.7 (No break) | 10.3 (No break) |
| Gardner impact @ −29° C. (in-lbs) | 299 | 308 | 311 | 312 | 310 |
| Failure Mode | Ductile | Ductile | Ductile | Ductile | Ductile |
| Gloss @ 60° angle | 70 | 59 | 60 | 46 | 49 |
| Instrumented impact @ 15 mph, −29° C. (ft-lbs) | 33.2 (5D)* | 34.4 (5D) | 34.6 (5D) | 36 (5D) | 36.1 (5D) |
| Instrumented impact @ 15 mph, −18° C. (ft-lbs) | 34.4 (5D) | 34.5 (5D) | 34.1 (5D) | 34.6 (5D) | 34 (5D) |
| Impact tests (on parts) | Not tested | Not tested | Not tested | Pass | Not tested |
| Cycle time | Not tested | Not tested | Not tested | Good | Not tested |

*Failure mode: B—brittle, BD—brittle-ductile, DB—ductile-brittle, and D—ductile

Comparative example 1 shows good Flexural Modulus and room temperature Notched Izod and passes the critical creep deflection test and the impact tests on the materials handling parts, but is defensive in cycle time due to the low MFR (4 dg/min). In contrast, comparative examples 2 and 3 have good flexural modulus, but low in the room temperature notched Izod and did not pass the impact tests with the parts. Comparative example 3, shows creep deflection on real parts much closer to the specification limit and this is expected due to the very high homopolymer MFR (50 dg/min). Example 4, with good flexural modulus and room temperature Notched Izod as well as the instrumented impact up to −29° C. is expected to pass all the parts tests for the materials handling.

Cycle Time in Injection Molding:

The cycle time in injection molding includes the following steps—injection, packing, cooling and part ejection. The typical cycle time in injection molding can be between 60-70 seconds depending on the part size and complexity. The bulk of the molding cycle time is the cooling step (this can be 40-50 seconds) where the polymer melt is allowed to solidify before the mold is open and the part is ejected.

Utilization of nucleating agents such as sodium benzoate and/or HPN-68L in polypropylene, helps to accelerate the solidification process in injection molding, and lowering the overall time cycle time by as much as 10-20%.

The effect of nucleating agents on polypropylenes (homopolymer, randon copolymer or impact copolymer) is often measured by using differential scanning calorimetry (DSC), and measuring what is known in the industry as crystallization half-time ($T_{1/2}$). The crystallization half-time is taken as the time to reach 50% crystallinity at a specified isothermal temperature. The temperature chosen to run $T_{1/2}$ has a significant effect. For example, if the temperature is high as an example 140° C., it takes long time to initiate the crystallization process, while the crystallization process goes much faster at a temperature of 120° C.

TABLE 4

Crystallization half-times.

| Sample | Nucleation and level | $T_{1/2}$ at 135° C. (min) |
| --- | --- | --- |
| Impact copolymer, 11 MFR | None | 15.5 |
| Impact copolymer, 11 MFR | Sodium benzoate, 0.075 wt % | 8.3 |
| Impact copolymer, 11 MFR | HPN-68L, 0.03 wt % | 0.47 |

Note:
The base impact copolymer used for nucleation studies is a commercial polymer made in the slurry loop reactors followed by gas phase reactor.

The sodium benzoate lowered the crystallization half-time by almost 50%, while the improvement with HPN-68L is very significant even at very low level.

Test Methods

The following ASTM test methods in Table 5 and described below were utilized for the physical property measurements.

TABLE 5

Test Methods

| Property | ASTM Method |
| --- | --- |
| Melt Flow Rate (dg/min or g/10 min) | D 1238, Condition L |
| 1% Secant Flexural Modulus (MPa), psi | D 790 A |
| Tensile strength at Yield (MPa), psi | D 638 |

TABLE 5-continued

Test Methods

| Property | ASTM Method |
| --- | --- |
| Elongation at Yield (%) | |
| Elongation at Break (%) | |
| Notched Izod Impact Strength (ft-lbs/in) | D 256 |
| Gardner Impact @ −29° C. (J), in-lbs | D 5420, Geometry GC |
| Heat Distortion Temperature (HDT) @ 0.45 MPa load (° C.) | D 648 |
| Instrumented Impact @ specified speed, total energy (J), ft-lbs | D 3763 |

Melt Flow Rate (MFR): MFR is measured as per ASTM D1238, condition L, at 230° C. and 2.16 kg load using a melt indexer.

Flexural Modulus: The flexural modulus is measured according to ASTM D790A, using a crosshead speed of 1.27 mm/min (0.05 in/min), and a support span of 50.8 mm (2.0 in) using an Instron machine.

Tensile Strength: The tensile strength at yield, elongation at yield and elongation at break were measured as per ASTM D638, with a crosshead speed of 50.8 mm/min (2.0 in/min), and a gauge length of 50.8 mm (2.0 in), using an Instron machine.

Gardner Impact: The Gardner impact strength is measured according to ASTM D5420, geometry GC, at −29° C.

Notched Izod Impact Strength: The Notched Izod impact strength is measured as per ASTM D256 at room temperature (21° C.), using an equipment made by Empire Technologies Inc.

Heat Distortion Temperature (HDT): The HDT is measured according to ASTM D648, using a load of 0.45 MPa (66 psi).

Having described the various features of the propylene impact copolymer(s) and the process(es) for making the propylene impact copolymer(s), described in numbered embodiments is:

1. A propylene impact copolymer comprising at least two unbalanced polypropylenes and at least one elastomeric polymer wherein the propylene impact copolymer has an $MFR^{ICP}$ within the range from 6 to 18 dg/min; a 1% Secant Flexural Modulus of greater than 150 kpsi (1030 MPa); and an Izod Impact at 25° C. of greater than 10 ft-lbs/in (530 J/m).

2. The propylene impact copolymer of numbered embodiment 1, wherein the at least two unbalanced polypropylenes comprise a first polypropylene having an $MFR^1$ and a second polypropylene having an $MFR^2$; wherein the $MFR^2/MFR^1$ is greater than 1.5.

3. A propylene impact copolymer comprising a first polypropylene having an $MFR^1$ within the range from 8 to 40 dg/min; a second polypropylene having an $MFR^2$ within the range from 50 to 190 dg/min; an elastomeric polymer; and wherein the propylene impact copolymer has an $MFR^{ICP}$ within the range from 6 or 8 or 9 to 13 or 15 or 18 dg/min; a 1% Secant Flexural Modulus of greater than 150 kpsi (1030 MPa); and an Izod Impact at 25° C. of greater than 10 ft-lbs/in (530 J/m).

4. The propylene impact copolymer of any of the preceding numbered embodiments, wherein the first, or second, or both polypropylenes are propylene copolymers comprising within the range from 0.1 to 5 wt %, by weight of the copolymer, of ethylene or C4 to C12 α-olefin derived units.

5. The propylene impact copolymer of any of the preceding numbered embodiments, wherein the first, or second, or both polypropylenes are propylene homopolymers.
6. The propylene impact copolymer of any of the preceding numbered embodiments, wherein the propylene impact copolymer comprises within the range from 30 or 40 to 60 or 70 wt %, by weight of the propylene impact copolymer, of the first polypropylene.
7. The propylene impact copolymer of any of the preceding numbered embodiments, wherein the propylene impact copolymer comprises within the range from 10 or 20 to 30 or 40 wt %, by weight of the propylene impact copolymer, of the second polypropylene.
8. The propylene impact copolymer of any of the preceding numbered embodiments, wherein the propylene impact copolymer comprises within the range from 15 or 20 or 22 to 26 or 30 or 35 wt %, by weight of the propylene impact copolymer, of the elastomeric copolymer.
9. The propylene impact copolymer of any of the preceding numbered embodiments, wherein the elastomeric polymer is an ethylene-propylene copolymer comprising within the range from 35 or 40 or 45 to 60 or 65 or 70 wt %, by weight of the copolymer, of ethylene-derived units.
10. The propylene impact copolymer of any of the preceding numbered embodiments, wherein the elastomeric polymer is uncured.
11. The propylene impact copolymer of any of the preceding numbered embodiments, wherein cross-linkable monomer units are substantially absent from the elastomeric polymer.
12. The propylene impact copolymer of any of the preceding numbered embodiments, wherein the $MFR^2/MFR^1$ is within the range from 2 or 2.5 or 3 to 4 or 4.5 or 5 or 6.
13. The propylene impact copolymer of any of the preceding numbered embodiments, wherein the elastomeric polymer has an intrinsic viscosity $IV^R$, and the first and second polypropylenes have a collective intrinsic viscosity $IV^{PP}$, wherein the ratio of $IV^R/IV^{PP}$ is within the range from 1.50 or 1.75 or 1.80 to 2.70 or 3.00 or 4.00.
14. The propylene impact copolymer of any of the preceding numbered embodiments, wherein the first polypropylene has an $MFR^1$ within the range from 15 to 35 dg/min.
15. The propylene impact copolymer of any of the preceding numbered embodiments, wherein the second polypropylene has an $MFR^2$ within the range from 65 to 100 dg/min.
16. The propylene impact copolymer of any of the preceding numbered embodiments, wherein the propylene impact copolymer has an Instrumented Impact (5 mph at −29° C.) of greater than 35 ft-lbs (47 J).
17. The propylene impact copolymer of any of the preceding numbered embodiments, wherein the propylene impact copolymer has a Tensile at Yield of greater than 3100 psi (21.4 MPa).
18. The propylene impact copolymer of any of the preceding numbered embodiments, wherein the propylene impact copolymer has a Gardner Impact (−29° C.) of greater than 300 in-lbs (34 N-m).
19. The propylene impact copolymer of any of the preceding numbered embodiments, produced in situ within at least one reactor.
20. The propylene impact copolymer of any of the preceding numbered embodiments, produced in situ within at least two reactors associated in series.
21. The propylene impact copolymer of any of the preceding numbered embodiments, produced in situ within three reactors, wherein the first polypropylene is produced in a first reactor and the second polypropylene is produced in a second reactor and the elastomeric polymer is produced in a third reactor, each reactor associated in series.
22. The propylene impact copolymer of any of the preceding numbered embodiments, further comprising from 200 to 1500 ppm of a nucleating agent.
23. The propylene impact copolymer of any of the preceding numbered embodiments, wherein the crystallization half-time at 135° C. is less than 15 or 12 or 10 or 5 or 2 minutes or 60 or 40 seconds.
24. An injection molded article comprising the propylene impact copolymer of any of the preceding numbered embodiments.
25. A pallet comprising the propylene impact copolymer of any of the preceding numbered embodiments.
26. A method of producing a propylene impact copolymer any of the preceding numbered embodiments comprising: (a) contacting a catalyst composition with propylene, a first amount of a chain terminating agent and optionally ethylene or C4 to C12 α-olefins in a first reactor to form a first polypropylene comprising no more than 5 wt %, by weight of the first polypropylene, of ethylene or α-olefin derived units; (b) contacting the catalyst composition and first polypropylene with propylene, a second amount of a chain terminating agent, and optionally ethylene or C4 to C12 α-olefins in a second reactor to form a second polypropylene comprising no more than 5 wt %, by weight of the second polypropylene, of ethylene or α-olefin derived units, wherein the second amount of chain terminating agent is greater than the first amount of chain terminating agent; and (c) contacting the catalyst composition, first polypropylene and second polypropylene in a third reactor with propylene and ethylene to form ethylene-propylene copolymer comprising within the range from 35 or 40 or 45 to 60 or 65 or 70 wt %, by weight of the copolymer, of ethylene-derived units.
27. The method of the preceding numbered embodiment 26, wherein the first amount of chain terminating agent is added such that the first polypropylene has an $MFR^1$ within the range from 8 or 15 or 18 to 35 or 40 dg/min.
28. The method of any of the preceding numbered embodiments 26-27, wherein the second amount of chain terminating agent is added such that the second polypropylene has an $MFR^2$ within the range from 50 or 65 or 70 to 100 or 120 or 190 dg/min.
29. The method of any of the preceding numbered embodiments 26-28, wherein the second amount of chain terminating agent is greater than the first amount of chain terminating agent such that the $MFR^1$ of the first polypropylene is at least 30 or 40 or 50% less than the $MFR^2$ of the second polypropylene.
30. The method of any of the preceding numbered embodiments 26-29, wherein the first and second reactors are slurry-loop reactors.
31. The method of any of the preceding numbered embodiments 26-30, wherein the third reactor is a gas phase reactor.
32. The method of any of the preceding numbered embodiments 26-31, wherein the amount of the first chain terminating agent is less than 2000 or 1800 mol ppm as measured in the propylene feed to the reactor.

33. The method of any of the preceding numbered embodiments 26-32, wherein the amount of the second chain terminating agent is greater than 2500 or 2800 mol ppm as measured in the propylene feed to the reactor.

34. The method of any of the preceding numbered embodiments 26-33, further comprising injecting a melt of the propylene impact copolymer comprising a nucleating agent into a mold to form an article at a cycle time of less than 80 or 70 or 60 seconds.

35. The method of any of the preceding numbered embodiments 26-34, wherein the catalyst composition is the same in each step.

36. The method of any of the preceding numbered embodiments 26-35, wherein the catalyst composition in the second reactor is different from the catalyst composition in the first reactor.

37. The method of the preceding numbered embodiment 36, wherein the catalyst composition differs in the identity of the electron donor used with the Ziegler Natta catalyst composition.

Provided in another embodiment is the use of a propylene impact copolymer to make an injection molded article, the impact copolymer comprising a first polypropylene having an $MFR^1$ within the range from 8 to 40 dg/min; a second polypropylene having an $MFR^2$ within the range from 50 to 190 dg/min; an elastomeric polymer; and wherein the propylene impact copolymer has an $MFR^{ICP}$ within the range from 6 or 8 or 9 to 13 or 15 or 18 dg/min; a 1% Secant Flexural Modulus of greater than 150 kpsi (1030 MPa); and an Izod Impact at 25° C. of greater than 10 ft-lbs/in (530 J/m).

Provided in yet another embodiment is the use of a three-series reactor system to produce, in situ, a propylene impact copolymer comprising a first polypropylene having an $MFR^1$ within the range from 8 to 40 dg/min; a second polypropylene having an $MFR^2$ within the range from 50 to 190 dg/min; an elastomeric polymer; and wherein the propylene impact copolymer has an $MFR^{ICP}$ within the range from 6 or 8 or 9 to 13 or 15 or 18 dg/min; a 1% Secant Flexural Modulus of greater than 150 kpsi (1030 MPa); and an Izod Impact at 25° C. of greater than 10 ft-lbs/in (530 J/m).

What is claimed is:

1. A propylene impact copolymer comprising at least two unbalanced polypropylenes and at least one elastomeric polymer wherein the propylene impact copolymer has an $MFR^{ICP}$ within the range from 6 to 18 dg/min; a 1% Secant Flexural Modulus of greater than 150 kpsi (1030 MPa); and an Izod Impact at 25° C. of greater than 10 ft-lbs/in (530 J/m).

2. The propylene impact copolymer of claim 1, wherein the at least two unbalanced polypropylenes comprise a first polypropylene having an $MFR^1$ and a second polypropylene having an $MFR^2$; wherein the $MFR^2/MFR^1$ is greater than 1.5.

3. A propylene impact copolymer comprising:
   (a) a first polypropylene having an $MFR^1$ within the range from 8 to 40 dg/min;
   (b) a second polypropylene having an $MFR^2$ within the range from 50 to 190 dg/min;
   (c) an elastomeric polymer; and
   wherein the propylene impact copolymer has
      an $MFR^{ICP}$ within the range from 6 to 18 dg/min;
      a 1% Secant Flexural Modulus of greater than 150 kpsi (1030 MPa); and
      an Izod Impact at 25° C. of greater than 10 ft-lbs/in (530 J/m).

4. The propylene impact copolymer of claim 3, wherein the elastomeric polymer is uncured.

5. The propylene impact copolymer of claim 3, wherein cross-linkable monomer units are substantially absent from the elastomeric polymer.

6. The propylene impact copolymer of claim 3, wherein the $MFR^2/MFR^1$ is within the range from 2 to 6.

7. The propylene impact copolymer of claim 3, wherein the propylene impact copolymer has an Instrumented Impact (5 mph at −29° C.) of greater than 35 ft-lbs (47 J).

8. The propylene impact copolymer of claim 3, produced in situ within at least one reactor.

9. The propylene impact copolymer of claim 3, produced in situ within three reactors, wherein the first polypropylene is produced in a first reactor and the second polypropylene is produced in a second reactor and the elastomeric polymer is produced in a third reactor, each reactor associated in series.

10. The propylene impact copolymer of claim 3, further comprising from 200 to 1500 ppm of a nucleating agent.

11. The propylene impact copolymer of claim 10, wherein the crystallization half-time at 135° C. is less than 15 minutes.

12. An injection molded article comprising the propylene impact copolymer of claim 3.

* * * * *